United States Patent [19]
Brown

[11] 4,247,493
[45] Jan. 27, 1981

[54] PROCESS FOR REMOVING DEFECTS FROM LENS SURFACES

[76] Inventor: Terrence M. Brown, 2429 New York Ave., Great Lakes, Ill. 60088

[21] Appl. No.: 98,658

[22] Filed: Nov. 29, 1979

[51] Int. Cl.³ .............................................. B29D 11/00
[52] U.S. Cl. ............................. 264/1.4; 219/10.55 M; 264/25; 264/36; 351/42
[58] Field of Search ........................ 264/1, 25, 36, 22; 425/174.4; 219/10.55 M, 10.55 K; 350/178; 351/42, 177

[56] References Cited

U.S. PATENT DOCUMENTS

| 3,171,869 | 3/1965 | Weinberg | 264/1 |
| 3,227,507 | 1/1966 | Feinbloom | 264/1 |
| 3,365,522 | 1/1968 | Inone | 264/25 |
| 3,634,219 | 1/1972 | Sinai | 351/177 |
| 3,765,861 | 10/1973 | Bole | 351/177 |
| 4,017,238 | 4/1977 | Robinson | 264/1 |

OTHER PUBLICATIONS

"Plastics–Microwaves Pro and Cons", SPE Journal, C. H. Will, Nov. 1968, vol. 24, pp. 29–32.

Primary Examiner—James B. Lowe
Attorney, Agent, or Firm—Robert E. O'Neill

[57] ABSTRACT

A technique for correcting defects in lens surfaces caused during lens formation. During the formation of a plastic lens, a low melting point alloy block is applied to the convex surface of the lens to hold the lens for working and machining. Upon removal, a defect in the lens surface, such as distortion, warping or aberration may appear in the area which was beneath the low melting point alloy. Accordingly, the lens is treated by subjecting it to microwave energy until the defect is removed from the lens surface, thereby reducing waste in the lens forming process.

8 Claims, No Drawings

PROCESS FOR REMOVING DEFECTS FROM LENS SURFACES

BACKGROUND OF THE INVENTION

The present invention relates to a technique for forming optical devices and more particularly, to a technique for removing defects in a lens caused during the forming process.

In the prior art, a variety of techniques have been employed which facilitate the formation and manipulation of a lens during construction. Normally, a lens blank is first formed from conventional plastic material and worked or machined to form the finished lens product. In order to hold the lens during such machining, a holder must be employed to position and move the lens for appropriate modifications. In one such technique, the holder is formed as a low melting point alloy block (LMPA) which is applied to one surface of the lens and used to support the lens during machining. Afterwards, the block is removed from the lens surface and the lens used for forming eyeglasses and such.

While the above technique has been found to be simple and effective in operation, it has been discovered that a certain percentage of the lenses formed have defects in the lens surface following removal of the low melting point alloy block. The defects appear as warping, aberrations or distortions and are believed to be caused by the heat from the application of the low melting point alloy to the surface of the lens. Such defects are not acceptable and therefore cause such lenses to be discarded as waste in the lens forming process.

Although the number of lenses exhibiting the presence of a defect in the formation process is only a relatively small percentage of the total number of lenses made, any reduction in the number of wasted lenses would decrease the cost per lens and increase the efficiency of the process. Accordingly, the present invention has been developed to overcome the shortcomings of the above known and similar techniques and to provide a process for eliminating defects caused during lens formation.

SUMMARY OF THE INVENTION

There is disclosed a method which corrects for defects in a lens surface caused during lens formation. A molded plastic lens blank, or a finished lens product, is first coated on one surface with a light uniform coating of a protective material. A low melting point alloy block is then applied to that surface by molding the block to the surface covered by the protective material. The lens or lens blank is then machined or otherwise worked to form the finished or modified lens product by using the low melting point alloy as the support holder during finishing. The block is then removed and the lens washed and inspected to determine if there are any defects in the lens surfaces. If a defect such as a distortion, aberration or warping is found, the lens is subjected to treatment with microwave radiation for a period sufficient to remove the above noted defects. Such defects may appear as a result of the application of the low melting point alloy or working the lens surface. Once properly subjected to the microwave radiation, the lens may then be used, thereby reducing the number of wasted lenses in the forming process and reducing the possibility of damage in the process of lens modification.

It is therefore a feature of the invention to provide a simple and inexpensive technique for removing defects in lenses.

It is another feature of the invention to provide a technique for removing lens defects by the application of microwave energy.

It is still another feature of the invention to provide a technique for removing defects from a lens surface caused by the application of a low melting point alloy member.

Yet another feature of the invention is to provide a technique for removing distortions, aberrations and warping on a lens surface by the application of microwave energy.

Other advantages and novel features of the invention will become apparent from the following detailed description.

DETAILED DESCRIPTION OF A PREFERRED EMBODIMENT

Generally, the basic techniques and structures used in the formation of lenses are well known in the prior art. Such techniques and structures include the formation of lenses and lens blanks by molding techniques using conventional plastic materials and the modification of lens blanks or lenses by machining. The techniques are applicable to the formation of a variety of lens structures including lenses for eyeglasses, contact lenses, and numerous other optical devices. Although there are a multitude of the types and uses of such lens structures, the present invention is applicable to and compatible with the formation of substantially any lens product requiring a lens free of defects from the construction process.

Since the function of any lens is primarily to modify the path of light passing through the lens, it is extremely important that the structure of the lens is formed without defects which alter the desired lens function. By way of example, if it is desired to form an eyeglass lens which corrects for a certain eye weakness by changing the focal point of the light passing therethrough, it is important that the light received from the image be precisely focused by the lens. If the lens is scratched, warped or otherwise distorted, the light will be deflected in such a way that the image transmitted will be of reduced quality and sharpness and the lens will not perform its intended purpose. Such lenses would naturally have to be discarded or otherwise modified prior to their use in an optical device.

As has been noted previously, in conventional lens forming processes, a lens may initially be molded from a plastic material to form a lens blank. The lens blank is then machined or otherwise worked to form the finished configuration of the lens for use in an optical device. During machining and working, however, it is necessary to use some technique to enable the lens to be held and positioned, without causing damages to the lens or lens surfaces. The size and configuration of the lens generally prohibits the use of conventional work holders and has led to a variety of techniques specifically designed to allow easy working and positioning of the lens material.

In one such technique, the surface of the lens blank is first lightly covered with a protective material to provide a uniform layer on one surface of the lens. The protective material may be a conventional coating material designed to protect the lens during working and blocking. For example, the protective material could be BPI Super-Hold sold by Brain Power Incorporated of Miami, Florida, or 192102 Lens Cote sold by American Optical Corporation of Southbridge, Massachusetts. A mold is then placed adjacent to the coated surface of the lens and a layer of low melting point alloy (LMPA), such as lead, poured into the mold and against the protective layer on the lens surface to form a lead block. This low melting point alloy material solidifies in the mold and also becomes attached to the surface of the lens through the protective layer. Thereafter, the molded low melting point alloy block may be used as a holder for the lens to allow the lens to be moved and positioned for machining and working of the lens.

After the machining or working of the lens has been completed, the LMPA block may be removed by applying a manual force sufficient to dislodge the block from the lens, or by applying enough heat to the block to cause it to detach from the lens surface at the protective layer. In any event, once the LMPA block has been removed, the lens can be washed or cleaned in an appropriate solution to remove the protective substance prior to its use in optical appliances.

While the above technique has been found to readily facilitate the working of the lenses to form a completed lens, it has been discovered that certain defects are sometimes present in the lens following removal of the LMPA block. These defects appear as aberrations, distortions or warping of the lens surface in the area beneath and adjacent to the area where the LMPA block was attached and are believed to be caused by the heat to which the surface area is subjected during attachment of the LMPA blocks. Although such defects are not incurred on all lenses to which the low melting point alloy block is attached, the defects still appear in approximately 1% to 5% of all the lenses formed by the above process.

Naturally, since it is important that the lens be free of any defects for the aforementioned reasons, any lens found to have such a defect has to be discarded, thereby resulting in waste and inefficiency in the process. Nevertheless, since the defects only appear in a small percentage of the total number of lenses formed, the process has still been economically feasible and is still used to produce lenses for optical appliances and products. In accordance with the present invention, however, the same process can now be used to produce lenses while reducing the number of lenses which have to be discarded as waste.

More specifically, it has been found that if the lens surface has aberrations, distortions, or warping following removal of the LMPA block, the same can be removed by treating the lens with microwave energy. By way of example, once the LMPA block has been removed from the surface of the lens, and the lens subsequently washed and cleaned to remove the protective material, the lens is inspected to determine if the application of the LMPA block or other working of the lens caused any warping, distortion or aberration in the surface of the lens. If such a defect is discovered, the lens is placed in a field of microwave radiation of sufficient intensity and duration so as to remove the defects. Generally, there are no critical values of intensity and duration of microwave energy to be observed. The duration and intensity will vary depending on the extent of the defect, the lens material, and the size of the lens, and may be determined with minimal experimentation by inspecting the lens at selected intervals during exposure to the microwave radiation until the defects are no longer observed.

The source of radiation may be of any conventional type, such as a typical microwave oven, which subjects the lens to a generally uniform field of microwave radiation. While it is not clear just how the lens defects are removed by the application of microwave energy, it is clear that no special positioning or other conditions are necessary to obtain removal of the noted defects. All that is required is that the lens be subjected to the microwave energy until inspection reveals that any aberration, distortion, or warping has been dispelled.

In a particular example of the present invention, a conventional molded plastic lens blank was formed to have a concave and convex surface and was coated on the convex surface with a protective material. The low melting point alloy block was then molded onto the coated surface to form a holder for machining and working the lens. Upon completion of the machining, the low melting point alloy block was removed and the lens washed to remove the protective coating. After inspection, the lens was found to have a defect on the convex surface caused by the application of the low melting point alloy block. Accordingly, the lens, which was approximately 65 mm in diameter and 2.2 mm in thickness, was placed in a Litton microwave oven set on high and exposed to radiation for a period of approximately 6 minutes. The lens was then removed and inspected and found to be free of any distortion, aberration or warping on the convex surface.

As can be seen from the above description, the present invention provides a simple and inexpensive technique for removing defects caused by the application of a low melting point alloy block during the lens forming process or by working the lens. The technique reduces the number of wasted lenses, thereby increasing the efficiency of the process. The present technique accomplishes the above results without requiring special and complex apparatus. None of these advantages are taught by the prior art.

Although the invention has been described with reference to the formation of a lens, it is evident that the technique is applicable to use in other instances. For example, if an existing lens needs to be modified to change its optical characteristics, the lens can be removed from the optical appliance and a coating of protective material applied to one of its surfaces. A low melting point alloy block can then be molded to attach the block to the coated surface. The lens can then be machined using the low melting point alloy block as the holder to retain and position the lens during modification. After removal of the low melting point alloy block, the lens can be washed and inspected to determine if any distortion, aberration, or warping was produced on the surface by the application of the low melting point alloy block. If so, the lens can be subjected to microwave radiation, as previously described, until the defects are removed. Thereafter, the lens can be mounted or inserted in the optical appliance for further use. This enables a simple modification of the lens without the danger of permanent damage to the lens by further working the lens or by the application of the low melting point alloy block.

Other modifications and variations of the present invention are possible in light of the above teachings. For example, the teachings of this invention apply equally well to working and manufacturing contact lenses. It is therefore to be understood that within the scope of the appended claims the invention may be practiced otherwise than as specifically described.

I claim:

1. A method for removing defects from the surface of a preformed lens comprising:
   selecting a preformed lens which has an aberration, distortion, or warping defect on its surface; and
   subjecting said lens to microwave radiation until the defect is removed.

2. The method of claim 1 wherein said lens is a plastic lens.

3. The method of claim 1 wherein said selecting step comprises, selecting a lens which has an aberration, distortion or warping caused by the application and removal of a low melting point alloy block.

4. The method of claim 1 wherein said selecting step comprises, selecting a preformed lens which has an aberration, distortion or warping caused during lens working.

5. The method of claim 1 wherein said subjecting step comprises,
   placing said lens in a field of microwave radiation,
   inspecting said lens at selected intervals to determine if a defect remains, and
   removing the lens from the field of microwave radiation when the defect is no longer observed.

6. In a method for forming a lens wherein a lens blank is molded and machined to form a lens, the improvement in said method comprising:
   selecting a molded lens blank;
   coating a surface of the lens blank with a protective material;
   molding a low melting point alloy block to the coated surface;
   machining or working the lens blank to form a lens;
   removing the low melting point alloy block from the coated surface;
   removing the protective material from the lens surface;
   inspecting the lens to determine if there are any aberrations, distortions, or warping of the surface caused by the application of the low melting point alloy block; and
   subjecting the lens having aberrations, distortions, or warping to microwave radiation until the distortion, aberration, or warping is removed.

7. The method of claim 6 wherein said lens blank is plastic and has a convex and concave surface.

8. The method of claim 7 wherein the protective material is applied to the convex surface of the lens blank.

* * * * *